Nov. 5, 1935.  A. G. RENDALL  2,020,214

ARTICLE MADE FROM SYNTHETIC RESINS, RUBBER AND OTHER LIKE MOLDABLE SUBSTANCES

Filed June 18, 1934

A. G. Rendall
INVENTOR

By: Marks & Clerk
Attys.

UNITED STATES PATENT OFFICE 2,020,214

ARTICLE MADE FROM SYNTHETIC RESINS, RUBBER, AND OTHER LIKE MOLDABLE SUBSTANCES

Arthur Geoffrey Rendall, Northfield, Birmingham, England, assignor to Morland & Impey Limited, Northfield, Birmingham, England Application June 18, 1934, Serial No. 731,166
In Great Britain July 5, 1933

12 Claims. (Cl. 154—43)

This invention relates to book covers and particularly covers for loose leaf binders.

The invention comprises a molded cover having in combination a layer or layers of a substance (such as synthetic resin or porous or fibrous sheets impregnated with synthetic resin) which in its initial state is modifiable as regards shape or character or both by the action of heat and pressure and which is hard in its final form, and a layer or layers of natural or synthetic rubber with or without a fabric or stranded reinforcement, which is capable of being and is united with the other substance at the temperature and pressure required to treat the other substance, the rubber being arranged to extend beyond one or more edges of and/or to protrude through apertures in the other substance, and the extending or protruding part or parts being given a desired shape.

The essential feature of my present invention will readily be ascertained from a description of typical examples.

In the accompanying sheet of explanatory drawing:—

Figure 1:
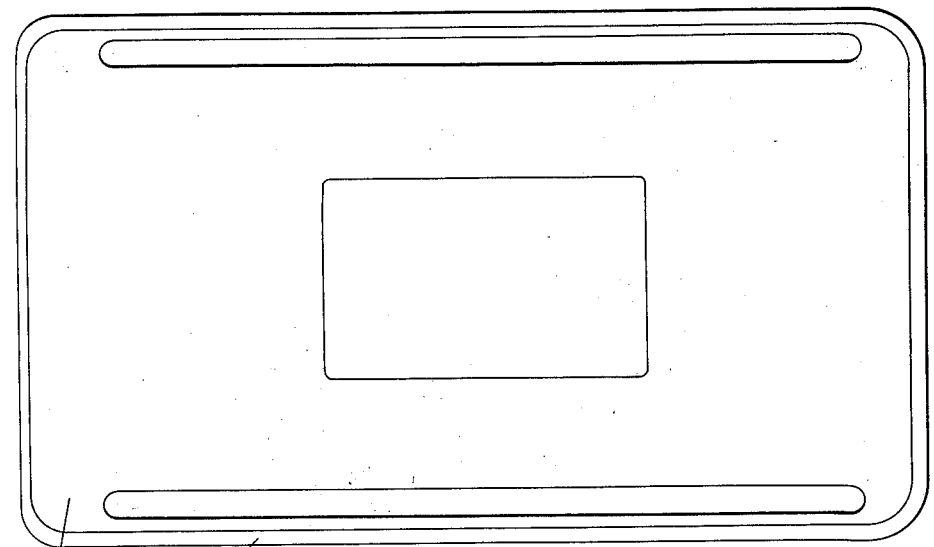
Figure 1 is a plan and Figure 2 a cross section of a loose leaf binder cover constructed in accordance with this invention.
Figure 2:
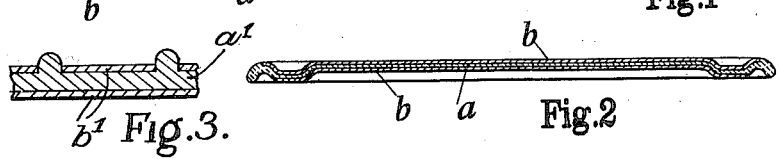

In the manufacture of covers for loose leaf binders I employ a combination of any convenient synthetic resin (such as the well known phenol-aldehyde products) and uncured or unvulcanized rubber, the synthetic resin being such that it requires about the same temperature for its treatment as the rubber. In one construction as shown in Figures 1 and 2 I place in a suitably shaped mold a sheet or sheets of soft rubber $a$ between layers $b$ of synthetic resin. The synthetic resin is so applied as to leave the edges of the rubber sheet exposed. The combination of materials is then subjected while in the mold to the action of heat and pressure in the way which is usual in the manufacture of articles from synthetic resin, the two materials being thus not only brought to the required final state but also united. In this way relatively soft rubber portions can be combined with the hard main portions and caused to take up any desired shape in a very convenient manner and more effectively than is otherwise possible.

To produce a book cover which is light and strong and in which the hard material is less liable to fracture than when made from ordinary synthetic resin only, I employ a sheet or sheets of fabric or strong paper or other suitable porous or fibrous material impregnated with synthetic resin in the places of the parts marked $b$ in Figures 1 and 2. These sheets are arranged in the mold on one or each side of the rubber sheet, leaving the latter exposed where it is required that the cover shall consist only of soft rubber parts, and the whole are combined while in the mold by the action of heat and pressure. The use of rubber in combination with fabric or other equivalent material impregnated with synthetic resin possesses the following additional advantage. When the fabric or the like alone is used it is difficult if not impossible to make it fill up all the parts of a mold of complex shape. By the use of soft rubber only at the parts of complex shapes I am able to employ impregnated fabrics more effectively than would otherwise be possible.

Figure 3:
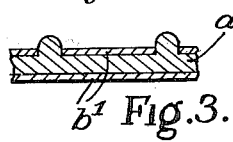
Figure 3 is a fragmentary cross section of a modification.

In some cases parts of the surface of the synthetic resin layer or layers may be perforated to expose a part or parts of the rubber layer, and under the pressure applied in a molding operation the rubber parts are caused to protrude, the protruding parts being shaped to any desired form as shown in Figure 3. In this figure the rubber layer is indicated by $a'$ and the synthetic resin layers by $b'$.

I desire it to be understood that the invention is not limited to the substances above specified. The term synthetic resin or the like has been used in a general sense to include any of the materials other than rubber now commonly termed thermoplastic substances which are brought to the finished condition by the action of heat and pressure. Such substances include products containing or made from phenol aldehyde, urea aldehyde, thio-urea aldehyde, bitumen, cellulose derivatives and the like, provided they can be treated at a temperature and pressure which will not cause a deleterious action on the rubber. Also the term rubber is used to include either the natural or the synthetic varieties of this substance with or without any required added substances such as vulcanizing agents.

Whilst for most purposes the resilient substance would be arranged between layers of the hard substance, this order may for some purposes be reversed, the resilient substance being then on the outer side, and in some instances the resilient substance would form one side and the hard substance the other side of the finished product. Further, I may for some purposes employ layers of the hard substance alternating with layers of the soft substance. For example I may employ two layers of rubber with intermediate and outer layers of synthetic resin. Further each layer of rubber or of hard material may itself in the first instance consist of a plurality of layers, which layers become united when the material is subjected to heat and pressure. Moreover, the soft material may have a fabric or strands of soft fibres incorporated with it.

Having thus described my invention what I claim as new and desire to secure by Letters Patent is:—

1. A molded book cover comprising in combination, a layer of rubber, and at least one layer of a thermo-plastic substance other than rubber united with the rubber layer, the said substance being harder than the rubber, and the layer of rubber being formed with a shaped portion extending beyond at least one edge of the other layer, substantially as described.

2. A molded book cover comprising in combination, a layer of rubber, and at least one layer of a thermo-plastic substance other than rubber provided with perforations and united with the rubber layer, the said substance being harder than the rubber, and the layer of rubber being formed with shaped portions which protrude through the said perforations and form rubber projections on the perforated layer, substantially as described.

3. A molded book cover as claimed in claim 1, in which the layer of thermo-plastic substance other than rubber is provided with perforations, and the layer of rubber is formed with shaped portions which protrude through the said perforations and form rubber projections on the perforated layer, substantially as described.

4. A molded book cover comprising in combination, a layer of rubber, and at least one layer of a material impregnated with a thermo-plastic substance other than rubber and united with the rubber layer, the said substance being harder than the rubber, and the layer of rubber being formed with a shaped portion extending beyond at least one edge of the other layer, substantially as described.

5. A molded book cover comprising in combination, a layer of rubber, at least one layer of a material impregnated with a thermo-plastic substance other than rubber and united with the rubber layer, and perforations in the layer of impregnated material, the said substance being harder than the rubber, and the layer of rubber being formed with shaped portions which protrude through the said perforations and form rubber projections on the perforated layer, substantially as described.

6. A molded book cover as claimed in claim 4, in which the layer of impregnated material is provided with perforations, and the layer of rubber is formed with shaped portions which protrude through the said perforations and form rubber projections on the other perforated layer, substantially as described.

7. A molded book cover comprising in combination, a layer of rubber, and two layers of a thermo-plastic substance other than rubber united respectively with opposite surfaces of the rubber layer, the said substance being harder than the rubber, and the layer of rubber being formed with a shaped portion extending beyond at least one corresponding edge of each of the other layers, substantially as described.

8. A molded book cover comprising in combination, a layer of rubber, two layers of a thermo-plastic substance other than rubber united respectively with opposite surfaces of the rubber layer, and perforations formed in one of the layers of the said substance, the said substance being harder than the rubber, and the layer of rubber being formed with shaped portions which protrude through the said perforations and form rubber projections on the perforated layer, substantially as described.

9. A molded book cover as claimed in claim 7, in which one of the layers of the said substance is provided with perforations, and the layer of rubber is formed with shaped portions which protrude through the said perforations and form rubber projections on the perforated layer, substantially as described.

10. A molded book cover comprising in combination, a layer of rubber, and two layers of a material impregnated with a thermo-plastic substance other than rubber and united respectively with opposite surfaces of the rubber layer, the said substance being harder than the rubber, and the layer of rubber being formed with a shaped portion extending beyond at least one corresponding edge of each of the other layers, substantially as described.

11. A molded book cover comprising in combination, a layer of rubber, two layers of a material impregnated with a thermo-plastic substance other than rubber, and united respectively with opposite surfaces of the rubber layer, and perforations formed in one of the layers of impregnated material, the said substance being harder than the rubber, and the layer of rubber being formed with shaped portions which protrude through the said perforations and form rubber projections on the perforated layer, substantially as described.

12. A molded book cover as claimed in claim 10, in which one of the layers of impregnated material is provided with perforations, and the layer of rubber is formed with shaped portions which protrude through the said perforations and form rubber projections on the perforated layer, substantially as described

ARTHUR GEOFFREY RENDALL.